(No Model.) 2 Sheets—Sheet 1.
W. J. BREWER.
ELECTRIC CONDUIT.
No. 440,822. Patented Nov. 18, 1890.
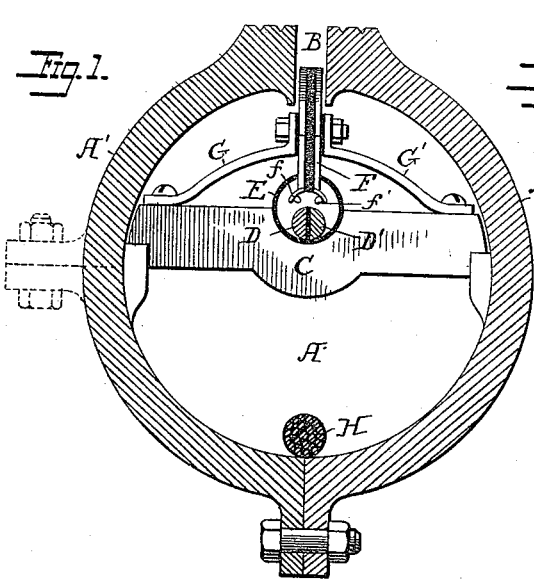
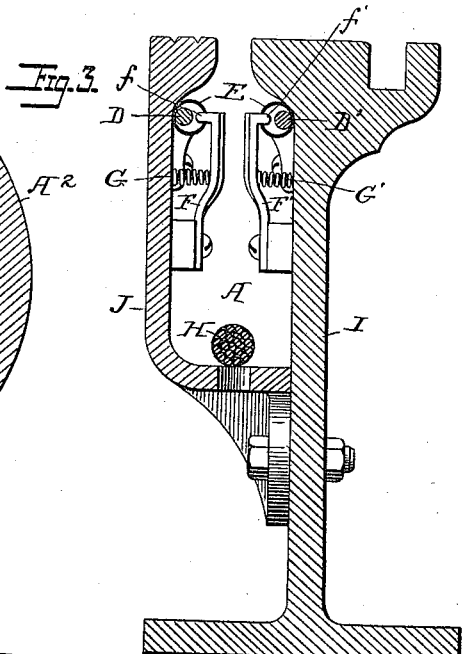
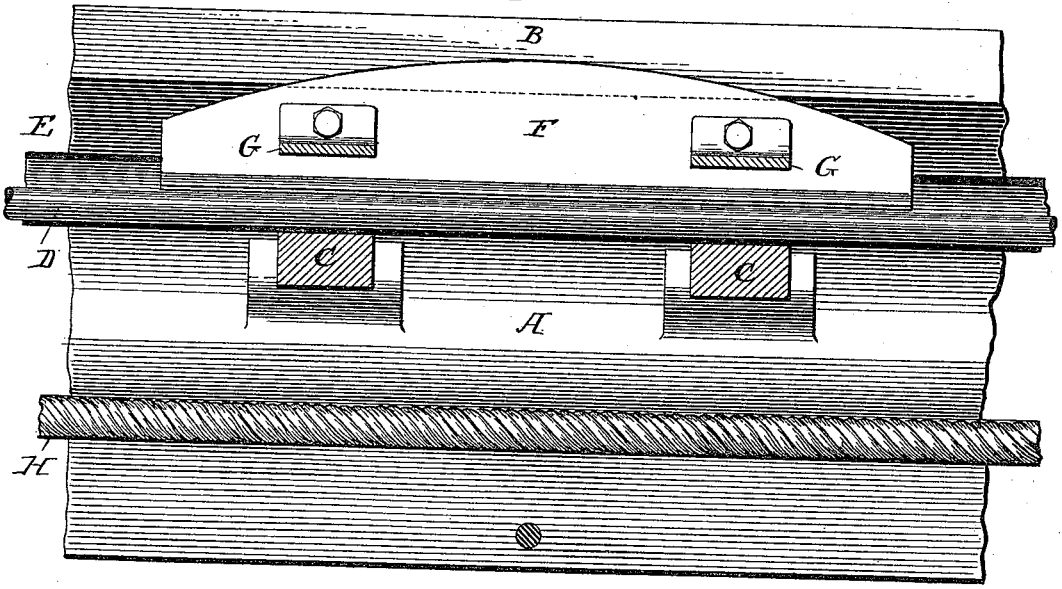
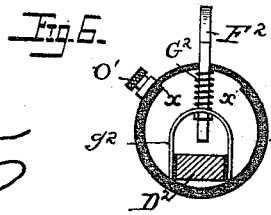
WITNESSES
INVENTOR
W. J. Brewer
By Foster & Freeman
Attorneys (No Model.) 2 Sheets—Sheet 2.
W. J. BREWER.
ELECTRIC CONDUIT.
No. 440,822. Patented Nov. 18, 1890.
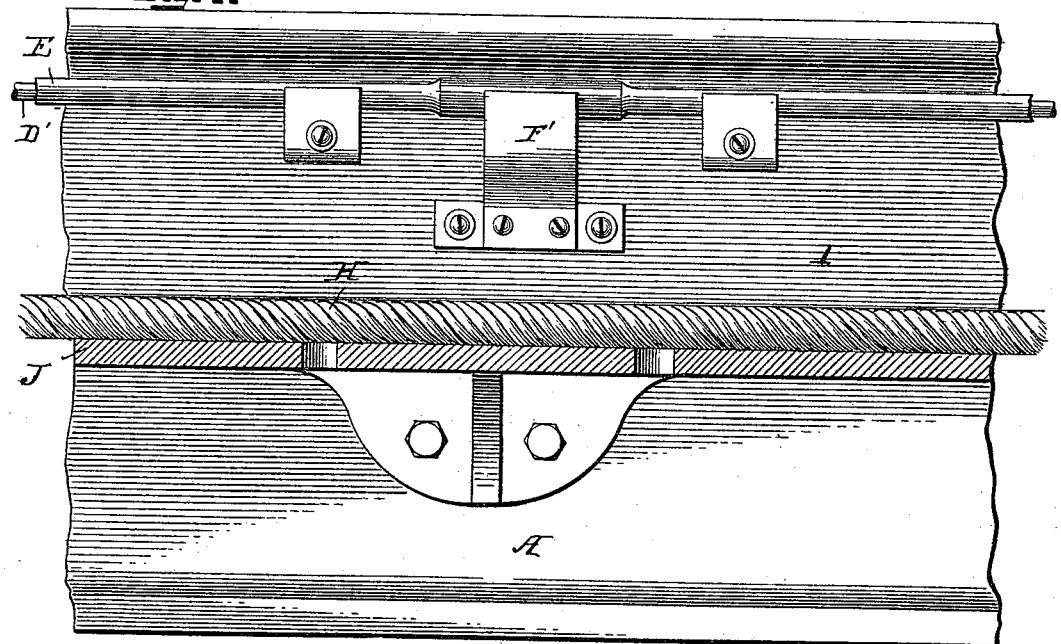
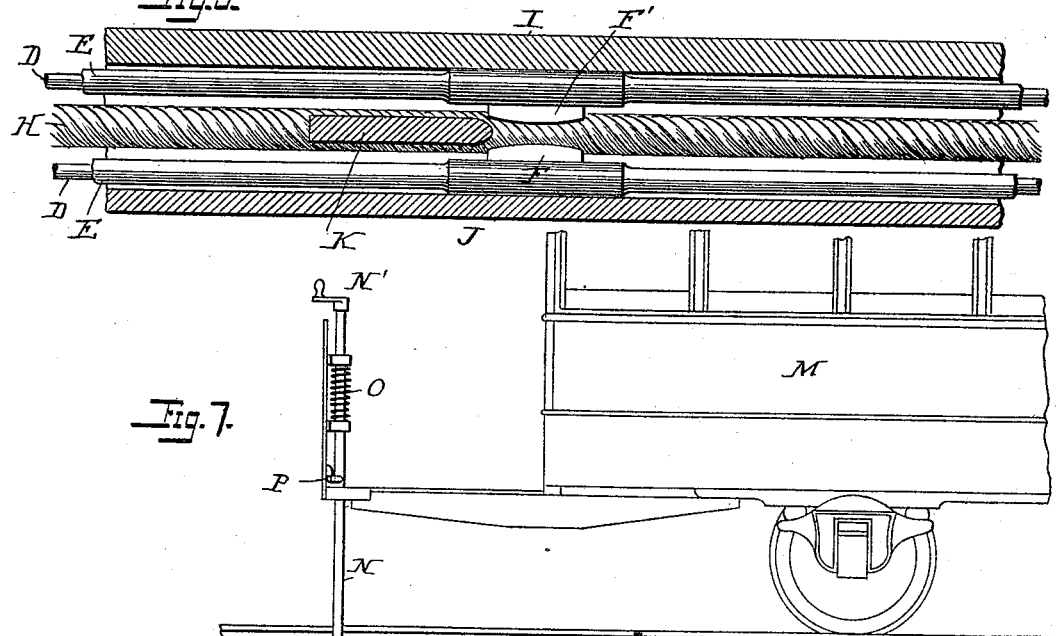
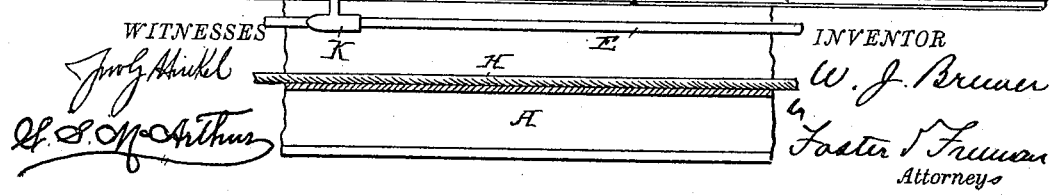
WITNESSES INVENTOR
W. J. Brewer
by Foster & Freeman
Attorneys

UNITED STATES PATENT OFFICE.

WILLIAM JOHN BREWER, OF NEW YORK, N. Y.

ELECTRIC CONDUIT.

SPECIFICATION forming part of Letters Patent No. 440,822, dated November 18, 1890.

Application filed July 15, 1890. Serial No. 358,785. (No model.)

*To all whom it may concern:*

Be it known that I, WILLIAM JOHN BREWER, a citizen of the United States, residing in the city, county, and State of New York, have invented certain new and useful Improvements in Electric Conduits, of which the following is a specification.

My invention relates to underground conduits and conductors for electric transmission, and is designed more especially for use in connection with electric railways, although of course it can be used otherwise.

The object of my invention is to provide improved means for conducting the electric current from the generating-station and supplying it to the motor or motors or other translating devices at a distance therefrom; and to these ends my invention consists in the various features of construction and arrangement of parts hereinafter more particularly pointed out.

Referring to the accompanying drawings, Figure 1 is a transverse section of a conduit and conductor and connections. Fig. 2 is a vertical longitudinal section of the same. Fig. 3 is a vertical transverse section of a conduit and rail combined. Fig. 4 is a vertical section of the same. Fig. 5 is a horizontal section. Fig. 6 is a cross-section of a modified form of conductor. Fig. 7 is a side view of a car with trolley.

In carrying out my invention I provide some suitable conduit which may be made of metal or other material of one or more parts bolted together, and in Fig. 1 I have shown a cylindrical conduit A, made up of two or more pieces $A'$ $A^2$, secured together by bolts at the lower end, leaving an open slot B between their upper portions. In this construction I provide a tie rod or brace C, which extends across the conduit on the inner side, being supported upon or connected to suitable lugs or projections extending therein. The slot in the top of the conduit is for the purpose of permitting the passage of the trolley or other device connected to the motor, and the tie rod or brace serves to support the conductor. The conductor in this instance is shown as consisting of two rods or plates of metal D D', suitably insulated from each other and serving to carry the positive and negative currents, although of course it is understood that some features of my invention can be used in connection with a single conductor carrying but one of the currents. This conductor is inclosed in a tube of insulating material, as E, which in the present instance is shown as a rubber hose or tube and as being somewhat larger in diameter than the cross-section of the conductors. At suitable intervals contact-pieces F are inserted through or connected with the rubber tube, and when the conductor consists of two parts this contact-piece consists of two contacts $f f'$, insulated from each other and extending upwardly into the slot, the ends thereof preferably being rounded or curved, as shown in Fig. 2. In order to support this contact-piece in the position shown, I provide springs G G', which are shown as mounted upon the cross-piece and secured to the contact-piece on either side, being properly insulated therefrom, and these springs normally tend to hold the contact-piece in its elevated position, so that the contacts $f f'$ are out of contact with the conductor. The rubber tube of course aids in this work, but is not generally found to have sufficient resiliency to support the contact-pieces under all conditions.

At the bottom of the conduit I provide a rope H, preferably of wire or chain, which lies upon the bottom of the conduit and which may be used to clear out the conduit by pulling it to and fro, thereby loosening any dirt or rubbish which may fall therein and assisting its discharge from the conduit, it being understood that the conduit is laid, as is usual, so that it is inclined toward certain man-holes or discharge-holes for moisture and other extraneous matters.

In Fig. 3 I have shown my invention applied to what may be termed a "split rail," in which the conduit A is formed of the web of the rail I, on one side having a bracket-piece J, extending therefrom and forming the other portion of the conduit. In this form I have shown two conductors D D', each consisting of a single wire or cable, each being inclosed in a rubber tube E and supported in the sides of the conduit upon suitable brackets. I have also shown two contact-pieces F F', respectively provided with contacts $f f'$, extending through the rubber tubes, and each of the contact-pieces is provided with a spring G G', respectively, which tends to hold the contact-pieces in their proper position out of contact with the conductors. In using this form of contact-pieces I preferably use a trolley K, (shown in Figs. 5 and 6,) being tapered or wedge-shaped at its front end and having a squared rear end. This allows the contact-pieces to make a quick sharp break of contact and prevent the establishing of an arc after the trolley has passed. The springs G G' aid in accomplishing this and force the contact-pieces away from the conductor and prevent any undue vibration which would be liable to produce arcing. As it is desirable that the car can travel in either direction over the conduit, I provide means whereby the trolley K can be reversed. Thus in Fig. 7 I have indicated a car M, having a trolley-arm N mounted on its front platform, and this is surrounded by a spring O, which tends to support it in its position, but when forced down into the conduit it is held by a spring-catch P. When it is desired to reverse the car or travel in the opposite direction, the trolley-arm N is lifted out of the conduit and turned a half-circle by the handle N', so that the pointed end of the trolley will be in the direction of the travel of the car.

In Fig. 6 I have shown a modified form of the conductor and contacts. The conductor $D^2$ is flattened either throughout its length or at the points of contact, so that the contact-pieces $F^2$ may bear upon the flattened surface of the conductor. The tube $E^2$ is preferably made flexible on one side only, as between the points $x$ $x$, the remainder being comparatively stiff or rigid, which may be accomplished by properly vulcanizing the rubber tube or by making a part thicker or otherwise. The contact-piece $F^2$ is secured to the more flexible portion of the tube, and a spring $G^2$, to retract the contact-piece, may be arranged inside the tube, bearing upon a support $g^2$, secured to the conductor. A plug O' may be fitted in the tube to furnish access to the conductor for inspection and repair purposes.

Of course it is understood that there can be a trolley-arm at each end of the car, both of which are properly connected with the motor on the car in the usual way, it not being deemed necessary to show the connections herein.

From this description it will be obvious that the conductor or conductors extend along the track for certain distances, and are not in communication with the motor or other translating device, except at or near the position of said motor, and as it passes along the trolley-arm presses the contact piece or pieces against the conductors, thereby transmitting the current to the translating device at that point, and as the motor passes this contact is broken and the next one is made. In this way I am enabled to thoroughly insulate the conductors and to protect them from leakage and convey the current in the most direct manner to the translating devices. The mechanical structure for containing the conductors is exceedingly simple and effective, not liable to get out of order, and is capable of being maintained free from extraneous matters by the chain or rope H.

What I claim is—

1. The combination, with the conduit, of a conductor consisting of two plates of conducting material insulated from each other, a rubber tube surrounding said conductor, and insulated contact-pieces passing through the rubber tube, substantially as described.

2. The combination, in a conduit, of a conductor, a rubber tube surrounding the conductor, contact-pieces passing through the tube, and springs supporting the contact-pieces, substantially as described.

3. The combination, with a conduit, of a rail having a bracket-piece connected therewith and forming, in connection with the rail, a conduit, conductors in said conduit inclosed in a flexible rubber tube, contact-pieces passing through said tube, and springs connected to said contact-pieces, substantially as described.

4. The combination, with a conduit, of a conductor inclosed in a rubber tube, contact-pieces passing through said tube, and springs connected to the contact-pieces, the outer edges of the contact-pieces being curved, substantially as and for the purpose set forth.

5. The combination, with a conduit provided with conductors and having spring-actuated contact-arms, of a motor-car provided with a trolley the forward end of which is wedge-shaped and the rear end is squared, substantially as described.

6. The combination, with a conduit, of a conductor having flattened portions, a tube inclosing the conductor having flexible portions, contact-pieces supported by said flexible portions, and a bearing for the contact-piece secured to the conductor inside the tube, substantially as described.

7. The combination, with a conduit, of a conductor having flattened portions, a tube inclosing the conductor having flexible portions, contact-pieces passing through the flexible portions, and a plug fitting an opening in the tube, substantially as described.

In testimony whereof I have signed my name to this specification in the presence of two subscribing witnesses.

WILLIAM JOHN BREWER.

Witnesses:
   CHAS. E. BENTLEY,
   GEO. R. DUNN.